United States Patent Office 3,505,265
Patented Apr. 7, 1970

3,505,265
PROCESS FOR THE PREPARATION OF ESSENTIALLY WATER-INSOLUBLE ADDITION POLYMERS IN AQUEOUS DISPERSION
Arthur S. Teot and Charles E. McCoy, Midland, Mich., assignors to The Dow Chemical Company, Midland, Mich., a corporation of Delaware
No Drawing. Continuation-in-part of application Ser. No. 414,836, Nov. 30, 1964. This application Aug. 2, 1967, Ser. No. 657,786
Int. Cl. C08f 1/13; C09d 5/02
U.S. Cl. 260—29.6                                   4 Claims

ABSTRACT OF THE DISCLOSURE

The present invention is directed to an improved process for preparing essentially water-insoluble addition polymers in aqueous dispersion wherein certain divalent salts of specified alkylated diphenyl ether sulphonates are used as dispersing agents during such polymerization. Utilization of this process provides for the formation of essentially coagula-free polymeric latexes which may be cast as continuous films which are highly insensitive to moisture.

---

This application is a continuation-in-part of Ser. No. 414,836, filed Nov. 30, 1964 now abandoned.

Aqueous dispersion coating compositions are usually prepared by emulsifying ethylenically unsaturated polymerizable monomers in a solution of dispersing agent and initiator, then agitating the resulting reaction mixture, usually at slightly elevated temperature, until the reaction has run to completion. The resulting aqueous dispersion can be used directly as a coating composition; however, usually it is formulated with pigments, extenders, coalescing agents and the like by conventional procedures. The dispersing agents used in the aforementioned composition are usually anionic, but, in some cases, are nonionic or cationic dispersing agents.

The presence of residual dispersing agents whether anionic, cationic or nonionic, in coatings of conventional aqueous dispersion coating compositions leads to several problems including the development of increased water sensitivity, particularly when the polymers employed therein are somewhat water sensitive themselves. This water sensitivity is exemplified by blistering and blushing of the coatings and/or corrosion of the substrates over which the coating compositions are applied. Blistering may be caused by water being drawn through and collecting under the dried coatings. Blushing refers to the hazy, cloudy appearance in coatings exposed to water which is believed to be caused by water absorbed in microscopic voids in the coatings. Water sensitivity of conventional aqueous dispersion coating compositions may also necessitate prime coating or other corrosion inhibiting treatment of substrates over which such compositions are applied. The water sensitivity of conventional coating compositions can also adversely affect the durability of dry coatings thereof, primarily by reducing gloss.

It is therefore an object of the present invention to provide aqueous coating compositions which are stable and which yield dry coatings having improved water resistance, durability and the like.

It is a further object to provide aqueous coating compositions of relatively high latex solids content without sacrifice in latex stability or control of particle size.

The above and related objects are accomplished by polymerizing ethylenically unsaturated polymerizable monomers in aqueous dispersion in the presence of from about 0.1 to 5 percent, based on the weight of the monomer, of a dispersing agent selected from the group having the structural formula:

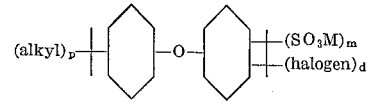

wherein "alkyl" represents an alkyl radical having from 8 to 18 carbon atoms; P is an integer from 1 to 2; halogen represents chlorine or bromine; d represents an integer from 0 to 2; M represents a divalent metal selected from the group consisting of the alkaline earth metals and zinc; and m represents an integer from 1 to about 3.

The monomers which may be advantageously polymerized by the process of this invention include, but are not restricted to conjugated dienes, vinyl chloride, vinylidene chloride, styrene, acrylonitrile vinyl carboxylates, acrylic or methacrylic esters and mixtures thereof.

Examples of conjugated dienes are the 1,3-butadienes including butadiene itself, chloroprene, isoprene, 2-methyl butadiene-1,3, 2-ethyl butadiene-1,3, 2,3-dimethyl butadiene-1,3, and the like. Examples of vinyl carboxylates, that is, monocarboxylic acid esters of vinyl alcohol, are vinyl acetate, vinyl propionate, vinyl butyrate, vinyl caprolate, vinyl laurate, vinyl palmitate, vinyl benzoate and the like. Examples of acrylic esters that is, esters of acrylic and alpha substituted acrylic acids are methyl acrylate, ethyl acrylate, propyl acrylate, isopropyl acrylate, isobutyl acrylate, amyl acrylate, octyl acrylate, 2-ethyl hexyl acrylate, methyl methacrylate, ethyl methacrylate, butyl methacrylate and dimethyl itaconate and the like.

The polymers prepared by the process of this invention can be homopolymers of the aforementioned polymerizable monomers or interpolymers thereof. Typical interpolymers include, for example, copolymers of butadiene and styrene, copolymers of vinyl chloride and vinylidene chloride, copolymers of vinyl chloride and vinyl acetate, copolymers of vinyl acetate and alkanol esters of acrylic and methacrylic acid, copolymers of the alkanol esters of acrylic and methacrylic acid and copolymers of acrylonitrile with the alkanol esters of acrylic and methacrylic acid.

It is another embodiment of the present invention that polymers and interpolymers containing free —COO— groups may be prepared by the process of the present invention to provide stable aqueous dispersions of dissociated, ionically cross-linked water-insoluble and water-insensitive resins. Exemplary of such polymers are those materials formed by the polymerization of one or more of the herein defined monomers with from about 0.25 to 25 percent based on the total weight of the interpolymer, of acrylic, methacrylic and/or itaconic acids and the like. Particularly useful polymers containing such free —COO— groups are the carboxylated styrene-butadiene copolymers, and the like.

It is further pointed out that the dispersing agent of the present invention is the only emulsifying or dispersing agent required during polymerization of such interpolymers, or during subsequent formulation of the resulting aqueous dispersions.

As stated hereinbefore, the dispersing agents used in this invention have the structural formula:

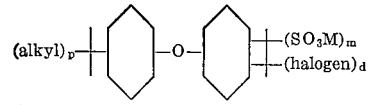

wherein "alkyl" represents an alkyl radical having from 8 to 18 carbon atoms; p is an integer from 1 to 2; halogen represents chlorine or bromine; d represents an integer from 0 to 2; M represents a divalent metal selected from the group consisting of the alkaline earth metals and zinc; and $m$ represents an integer from 1 to about 3. Thus, one can employ any of the herein indicated $C_8$–$C_{18}$ mono- or dialkylphenyl halogenated or non-halogenated ether, mono-, di- or trisulfonates, for example, magnesium, calcium, strontium, barium, radium and zinc salts of the respective acids; although the magnesium, calcium, barium and zinc salts are preferred since they are easily prepared by conventional means from readily available materials. Such compounds may be prepared in a variety of ways well known in the art. Thus, diphenyl oxide may be alkylated, halogenated and sulphonated as desired to produce the sulfonic acids. The latter may then be converted to any of the desired salts by reaction with the appropriate base or salt. It is readily apparent that in the synthesis of the dispersing agents described herein, one may, and usually does, obtain a mixture of products wherein the number of alkyl, halogen or sulfonate substituents on the diphenyl oxide nucleus has an average value other than the whole numbers. Such mixtures are in general fully as useful as the pure compounds.

As purely exemplary of preferred dispersing agents are: disulfonated dodecylphenyl ether, magnesium salt and disulfonated dodecylphenyl ether, zinc salt; monosulfonated monochlorinated dodecylphenyl ether, magnesium and zinc salts; monosulfonated monobrominated dodecylphenyl ether, magnesium and zinc salts and the corresponding calcium and barium salts; as well as the magnesium, calcium, barium and zinc salts of mono-, di- and tri-sulfonated octylphenyl ethers, nonylphenyl ethers and octadecylphenyl ethers and their mono- or di-chlorinated or brominated derivatives, or suitable mixtures thereof.

As stated hereinbefore, the invention contemplates the use of from about 0.1 to 5 percent of dispersing agent based on the weight of monomer. The lower limit on the amount of dispersing agent is governed largely by dispersibility of the so-formed polymers. Further, utilization of such dispersing agents in amounts greater than about 5 percent, is generally unnecessary and therefore uneconomical. Also, within the aforementioned limits the amount of dispersing agent used depends somewhat upon the particular dispersing agent selected and its dispersing power. Preferably from about 0.5 to 5 percent of the dispersing agent is used.

In the process of this invention, the dispersing agent and initiator for the polymerization reaction are usually first dissolved in water. Examples of initiators are azo and peroxide initiators such as 2,2'-azobis (isobutyronitrile), hydrogen peroxide, tertiarybutyl hydroperoxide, benzoyl peroxide, lauryl peroxide and the conventional persulfate-bisulfite initiators and the like. Preferably, from about 0.01 to 1.0 percent of initiator, based on the weight of polymerizable monomers, is used.

The polymerizable materials described herein are then charged to the reaction mixture and heated with vigorous agitation at a temperature of from about 5 to 70° C. until the reaction is substantially complete which is usually from about 5 to 20 hours. Monomeric materials are preferably charged slowly to minimize localized overheating.

Compositions containing from about 20 to 50 percent of polymer solids and having a pH of from about 3 to 9 are preferred. The pH of the compositions may be adjusted with ammonium hydroxide. It has been found possible when using carboxylated polymers, such as carboxylated styrene-butadiene copolymers or aqueous polymeric dispersions containing carboxylated additives, to obtain ionically crosslinked, water-insoluble and water-insensitive continuous coatings merely by adjusting the pH of the aqueous dispersions to a value of 7 to 9 or 10 with ammonia. As the pH is raised, the divalent metal ion of the dispersing agent is replaced on the sulfonic acid group of such material by ammonia and the metal, in turn, neutralizes the carboxyl groups, resulting in an electrostatic crosslinked polymer of enhanced water-resistance and strength properties. Thus, a crosslinked material may be obtained merely by raising the pH of the aqueous polymer containing dispersion. Further, such dispersions do not require and, in fact, preclude the presence of any other dispersing agent such as the conventionally used non-ionic materials.

As is conventional in the art, well known modifiers such as pigments and extenders, plasticizers, flow-control agents, coalescing agents and the like can be used in usual amounts.

The coating compositions prepared by the process of the present invention are stable, even at relatively high solids concentration, i.e., a percent solids of up to 50 percent or more. Further, such coatings may be cast utilizing any conventional technique, on a wide variety of substrates such as metals, wood, glass, fabrics, paper and the like to form dried coatings having improved water resistance, strength, and durability as compared with aqueous dispersion coating compositions containing conventional dispersing agents.

The following examples wherein all parts and percentages are to be taken by weight illustrate the present invention, but are not to be construed as limiting its scope.

EXAMPLE I

A polymerization charge was prepared by first adding 15 grams of gum arabic to 226.5 grams of deionized water, heating the same for 1 hour at 80° C. with agitation to dissolve the gum arabic and then cooling the so-formed solution to about 30° C. Thereafter 0.75 gram of ammonium persulfate, 0.05 gram of sodium bicarbonate, 6 grams of the dispersing agent disulfonated dodecylphenyl ether, magnesium salt, and 27.5 grams of vinyl acetate monomer were added. Polymerization was initiated by heating the mixture to a temperature of 80° C. followed by the addition of 247.5 grams of vinyl acetate over a period of about 2.5 hours with continuous agitation. The resulting aqueous dispersion was then cooled to about 25° C. to form a milky coagula free emulsion.

The dispersion was then cast as a continuous 20 mil film on a glass plate. The water sensitivity of the film was evaluated by placing 6 drops of water on the film and recording the time required for the film to become cloudy beneath the drops. It was found that 30 seconds were required for the development of the initial evidence of cloudiness.

By way of comparison, an identically prepared aqueous dispersion, but wherein the dispersing agent employed was the sodium salt of disulfonated dodecylphenyl ether, was found to contain significant amounts of undesirable coagula, and when cast as a film as above described, developed a noticeable cloudiness within 10 seconds following the application of water thereto.

Such results were further confirmed by scrubbing wet film as described herein with a Gardner straight-line scrubber wherein it was found that the coating prepared using the magnesium salt of the disulfonated dodecylphenyl ether of the present invention, withstood greater than 3,000 scrubbing strokes before deteriorating whereas an identically prepared coating prepared using the sodium salt of disulfonated dodecylphenyl ether withstood only 339 strokes.

EXAMPLE II

A polymerization charge was prepared by first admixing 54.2 grams of deionized water, 0.3 gram of potassium peroxydisulfate, 0.3 gram sodium bicarbonate and 1 gram (1 percent by weight of the mixture) of the zinc salt of disulfonated dodecylphenyl ether in a standard citrate bottle. Thereafter, 29.3 grams of styrene monomer were added and the mixture frozen by placing the citrate bottle in a Dry Ice methylene chloride bath. Then, 15.8 grams of butadiene monomer, liquefied in a condenser immersed in the Dry Ice bath were added to the contents of the cold citrate bottle and the bottle capped and polymerized for 16 hours at 60° C. Such polymerization resulted in about 98 percent conversion of monomer to polymers with the formation of a polymeric aqueous dispersion free of undesirable coagula. Similar good results were also obtained when the polymerization was repeated using 5 grams (5 percent by weight of the mixture) of the zinc salt of disulfonated dodecylphenyl ether.

By way of comparison, an identically prepared polymeric aqueous dispersion, using 1 percent of the sodium salt of disulfonated dodecylphenyl ether coagulated during polymerization and did not produce a latex from which a polymeric film could be cast.

EXAMPLE III

In each of a series of experiments a polymerization charge was prepared by admixing 43 weight percent vinyl chloride, 10.7 weight percent vinylidene chloride, 0.1 weight percent potassium peroxydisulfate, from 0.8 to 2.0 weight percent of the magnesium salt of disulfonated dodecylphenyl ether and from 44.2 to 45.4 weight percent deionized water in a standard citrate bottle. Each mixture was then individually polymerized for 16 hours at a temperature of about 60° C. Such polymerization resulted in about 95 to 98 percent conversion of monomer to polymer with the formation of polymeric aqueous dispersion free from undesirable coagula and characterized by an average solids particle size of between about 905 and 1,140 angstrom units.

EXAMPLE IV

A polymerization charge was prepared by admixing 54 grams of vinyl acetate; 1 gram of 2-hydroxyethyl cellulose; 3 grams of the magnesium salt of monosulfonated monochlorinated dodecylphenyl ether; 0.1 gram of potassium peroxydisulfate and 0.05 gram of sodium bicarbonate with sufficient deionized water to provide a mixture having a total weight of 100 grams; in a standard citrate bottle. The bottle was capped and the mixture polymerized for 16 hours at 60° C. to produce a conversion of monomer to polymer of about 97.3 percent, and a milky coagula free dispersion capable of forming continuous, water-resistant film.

EXAMPLE V

A polymerization charge was prepared by admixing 48.9 grams of deionized water, 0.2 gram of potassium peroxydisulfate, 0.1 gram of the tetrasodium salt of ethylenediaminetetraacetic acid, 0.1 gram of dodecylmercaptan and 1.7 grams of the zinc salt of disulfonated dodecylphenyl ether in a standard citrate bottle.

Thereafter, 24.5 grams of styrene monomer and 1.5 grams of methacrylic acid was added and the mixture frozen by placing the citrate bottle in a Dry Ice methylene chloride bath. Then, 23 grams of butadiene monomer, liquefied in a condenser immersed in the Dry Ice bath, was added to the contents of the cold citrate bottle and the bottle capped and polymerized for 16 hours at 60° C. and then neutralized to a pH of about 9 using ammonium hydroxide. Such polymerization resulted in about 97.3 percent conversion of monomers to polymer with the formation of a polymeric aqueous dispersion free of undesirable coagula such solids having an average particle size of about 1520 angstrom units.

A portion of the dispersion was then cast as a continuous 20 mil film on a glass plate, and allowed to dry for a period of about 24 hours. Thereafter, the dried film was removed from the plate and cut into a plurality of individual 1" by 4" strips for determination of tensile strength and elongation using conventional procedures. Such strips were found to have an average tensile strength of about 695 pounds per square inch and an elongation of about 890 percent. By way of comparison, aqueous dispersion prepared as described herein, wherein the zinc salt of disulfonated dodecylphenyl ether was replaced with the sodium salt of disulfonated dodecylphenyl ether, was found to contain significant amounts of coagula. Film samples prepared from such dispersions, as described above were found to have an average tensile strength of only about 102 pounds per square inch and an elongation of about 900 percent.

What is claimed is:

1. In the process of preparing aqueous dispersions of essentially water-insoluble addition polymers by polymerizing ethylenically unsaturated monomers in aqueous dispersion while in the presence of a dispersing agent for said monomers and said polymer and wherein an oil-in-water system is continuously maintained, the improvement consisting of: using as the sole dispersing agent from about 0.1 to 5 percent, based on the weight of said monomer, of at least one compound, having the structural formula:

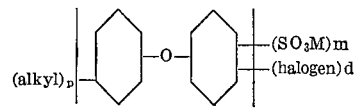

where "alkyl" is selected from the group consisting of alkyl radicals having from 8 to 18 carbon atoms; $p$ is an integer from 1 to 2; "halogen" is selected from the group consisting of chlorine and bromine; $d$ is an integer from 0. to 2; M is a divalent metal selected from the group consisting of the alkaline earth metals and zinc; and $m$ is an integer from 1 to about 3.

2. The process of claim 1 wherein said dispersing agent is disulfonated dodecylphenyl ether, magnesium salt.

3. The process of claim 1 wherein said dispersing agent is monosulfonated monochlorinated dodecylphenyl ether, magnesium salt.

4. The process of claim 1 wherein said dispersing agent is disulfonated dodecylphenyl ether, zinc salt.

References Cited

UNITED STATES PATENTS 3,202,638   8/1965   Ess.
3,264,243   8/1966   Knieriem.

SAMUEL H. BLECH, Primary Examiner

W. J. BRIGGS, SR., Assistant Examiner

U.S. Cl. X.R.

117—124, 132, 148, 155, 161; 260—29.7, 80.7, 83.7, 84.3, 87.5, 87.7, 89.1, 17, 512